3,258,448
NON-SCORCHING CURABLE CARBOXYLIC
POLYMER COMPOSITIONS
Victor L. Hallenbeck, Brecksville, and David Craig, Cuyahoga Falls, Ohio, assignors to The B. F. Goodrich Company, New York, N.Y., a corporation of New York
No Drawing. Filed May 22, 1961, Ser. No. 111,439
5 Claims. (Cl. 260—41)

This invention relates to non-scorching, heat curable carboxyl containing polymer compositions and more particularly pertains to non-scorching heat curable compositions comprising a major proportion of a polymeric carboxyl containing elastomeric or plastic material and a minor proportion of a sulfide coated polyvalent metal compound and to a method for preparing same.

The curing of carboxyl containing polymers by the condensation of the carboxyl groups with a polyvalent metal oxide is well known in the art. See for instance U.S. Patents 2,649,439; 2,662,874; 2,724,707 and 2,961,348 wherein the polyvalent metal oxide cure of various carboxyl containing plastic and rubbery polymers is disclosed. It is also well known that the salt formation reaction between a polyvalent metallic cation and a carboxyl-containing polymer is rapid and vigorous compared to, for example, sulfur vulcanization of natural and synthetic rubbers, and will occur to some extent when an intimate mixture of the polyvalent metal cation and the carboxyl-containing polymer are allowed to stand at ordinary temperatures. Because of this premature cure or scorching tendency it has been necessary to alter the normal rubber compounding procedure and to intermix the carboxyl containing polymer and the metal oxide rapidly at temperatures preferably below 200° F. and subsequent cure must be carried out without too much delay because of the aforementioned room temperature cure which takes place.

There has been a need for a method for premixing masterbatches of carboxyl containing polymer, polyvalent metal curing agent and other compounding ingredients, reinforcing agents and the like, to give a stock which can be stored for long periods of time at ordinary temperatures and can readily be subsequently heated, softened, melted, calendered, etc. with little or no scorching and cured rapidly at higher temperatures to give products having desirable physical properties. If such non-scorching masterbatches were available it would be possible for rubber manufacturers, for instance, to prepare them in conventional large scale rubber mixers and the masterbatch could then be supplied to the smaller fabricators who would only have to mold and cure the final rubber article. The economic advantages of the foregoing are quite obvious.

It is an object, therefore, to provide a plastic polymer stock comprising a carboxyl containing polymer and a compound having a polyvalent metal ion available for curing which is stable, non-scorching at ordinary temperatures and even elevated temperatures below the cure temperature. Another object is the provision of a novel method for preparing the foregoing stable, non-scorching stocks.

That the foregoing and other objects are accomplished by the present invention will become evident to those skilled in the art from a reading of the following description and examples.

We have discovered a heat curable, non-scorching novel composition comprising a major proportion of a plastic carboxyl containing polymer and a minor proportion of a polyvalent metal sulfide coated polyvalent metal compound.

The plastic carboxyl containing polymers useful in this invention include those resulting from the interpolymerization of one or more carboxylic monomers with one or more other monomers copolymerizable therewith, the polymerization of monomers having groups which are hydrolyzable to carboxyl groups or those resulting from the reaction of a carboxylating agent or carboxyl supplying reagent with a plastic or rubbery polymer which does not contain carboxyl groups.

Carboxylic interpolymers embodied herein are those resulting from the polymerization of a minor amount of carboxyl containing monomer with a major amount of one or more other monomers copolymerizable therewith. The olefinically unsaturated carboxylic acids are preferred as carboxyl containing monomers and the monomers copolymerizable therewith include conjugated dienes, acrylate esters, methacrylate esters, vinyl esters, monoolefins, vinyl cyanides, vinyl aromatic compounds, vinyl halides, vinyl ethers, maleate esters, fumarate esters, and the like.

The olefinically unsaturated carboxylic acids which are interpolymerized to give carboxyl polymers embodied herein are characterized as possessing one or more olefinic carbon-to-carbon double bonds and one or more carboxyl groups, that is, monocarboxy and poly-carboxy, monoolefinic and polyolefinic acids including, for example, such widely divergent materials as acrylic acid, the alpha-alkyl acrylic acids, crotonic acid, beta acryloxy propionic acid, alpha- and beta-vinyl acrylic acid, alpha,beta-diisopropylidene propionic acid, sorbic acid, cinnamic acid, maleic acid, oleic acid, undecylenic acid, recinoleic acid, linoleic acid, linolenic acid and others. Better results are obtained by utilization of one or more olefinically-unsaturated carboxylic acids containing at least one activated olefinic carbon-to-carbon double bond, that is, an acid containing an olefinic double bond which readily functions in an addition polymerization reaction because of the olefinic double bond being present in the monomer molecule either in the alpha-beta position with respect to a carboxyl group thusly —CH=CH—COOH or attached to a terminal methylene grouping thusly $CH_2=C<$.

Illustrative alpha-beta unsaturated carboxylic acids within the above-described preferred class include maleic acid, fumaric acid, crotonic acid, alpha-butyl crotonic acid, angelic acid, hydrosorbic acid, cinnamic acid, m-chlorocinnamic acid, p-chlorocinnamic acid, umbellic acid, beta-benzal acrylic acid, and other monoolefinic monocarboxylic acids; sorbic acid, alpha-methyl sorbic acid, alpha-ethyl sorbic acid, alpha-chlorosorbic acid, alpha-bromosorbic acid, beta-chlorosorbic acid, alpha-, beta-, or gamma-, epsilon-dimethyl sorbic acid, alpha-methyl-gamma-benzal crotonic acid, beta-(2-butene)-acrylic acid, 2,4-pentadienoic acid, 2,4,6-octatrienoic acid, 2,4,6,8-decatrienoic acid, 1-carboxy-1-ethyl-4-phenyl butadiene-1,3,2,6-dimethyl decatriene-(2,6,8)-oic-10 acid, alpha,beta-diisopropylidene propionic acid having the structure

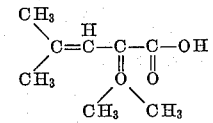

alpha vinyl cinnamic acid, alpha-isopropenyl-furfural acetic acid, alpha-isopropenyl-cinnamyl acrylic acid, and other polyolefinic monocarboxylic acids; hydromuconic acid, glutaconic acid, and other monoolefinic polycarboxylic acids; 3-carboxy-pentadiene-(2,4)-oic-1, muconic acid, and other polyolefinic polycarboxylic acids.

Olefinically unsaturated carboxylic acids containing the $CH_2=C<$ grouping include acrylic acid, alpha-chloro acrylic acid, methacrylic acid, ethacrylic acid, alpha-isopropylidene acrylic acid, alpha-styryl acrylic acid, beta vinyl acrylic acid, alpha-vinyl acrylic acid, beta-acryloxy acetic acid, and others.

Monomers copolymerizable with the foregoing carboxylic monomers which are useful in the interpolymers embodied herein include the open chain, aliphatic conjugated dienes including the butadiene-1,3-hydrocarbons such as butadiene-1,3 itself, 2-methyl butadiene-1,3 (isoprene), 2,3-dimethyl butadiene-1,3, piperylene, 2-neopentyl butadiene-1,3 and other hydrocarbon homologues of butadiene-1,3 and in addition the substituted dienes such as 2-chloro butadiene-1,3,2-cyanobutadiene-1,3, the straight- and branched-chain conjugated hexadienes and others. The butadiene-1,3 hydrocarbons and butadiene-1,3 in particular, because of their ability to produce stronger and more desirable polymers are much preferred.

Also included as monomers copolymerizable with the foregoing carboxylic monomers in the formation of carboxyl containing plastic and rubbery polymers embodied herein are monoolefinic monomers including acrylate esters such as methyl acrylate, ethyl acrylate, the propyl acrylates, the butyl acrylates, the amyl acrylates, the hexyl acrylates and acrylate esters in general wherein the alchohol moiety is composed of a hydrocarbon group having from 1 to 18 carbon atoms; the methacrylate esters such as methyl methacrylate, ethyl methacrylate, cyclohexyl methacrylate, phenyl methacrylate and methacrylate esters in general wherein the alcohol moiety is composed of a hydrocarbon group having from 1 to 18 carbon atoms; the vinyl halides such as vinyl chloride, vinyl bromide, vinyl fluoride, vinyl iodide, vinylidene chloride, tetrafluoroethylene, chlorotrifluoroethylene, and the like; the vinyl cyanides such as acrylonitrile, methacrylonitrile, vinylidene cyanide, alpha-cyanoethyl acrylate, maleic nitrile and the like; the vinyl aromatic monomers such as styrene, alpha-methyl styrene, the vinyl toluenes, the vinyl xylenes, vinyl biphenyl, vinyl naphthalene and the like; the allyl esters such as allyl acetate, allyl butyrate, methallyl acetate and the like; the vinyl esters such as vinyl acetate, vinyl propionate, vinyl butyrate, vinyl stearate, vinyl benzoate, isopropenyl acetate, isopropenyl laurate, and the like; the vinyl ethers such as vinyl methyl ether, vinyl ethyl ether, vinyl 2-ethyl hexyl ether and the like; vinyl pyridine, isobutylene, ethylene, propylene and the like; the allyl ethers such as methyl allyl ether, ethyl methallyl ether, and others.

Carboxyl-containing polymers disclosed in U.S. Patents 2,649,439; 2,662,874; 2,724,707 and 2,849,426 are all useful in the instant invention. The polymers containing from 0.001 to 0.30 chemical equivalent of (—COOH) per 100 parts of polymer (ephp.) are predominantly plastic in nature and are adapted to produce rubbery elastic compositions when condensed with a polyvalent metallic oxide. Polymers containing from 0.02 to 020 ephp. of carboxyl are preferred for the production of elastomeric metallo-carboxylates having the best balance of properties while those containing from 0.02 to 0.10 ephp. of carboxyl are preferred for the production of strong elastic compositions having most excellent low temperature flexibility.

The sulfide coated polyvalent metal compound is admixed with the carboxyl-containing polymer in any conventional manner such as by mill-mixing, in a Banbury or other type of internal mixer, by mixing an aqueous dispersion of the sulfide coated polyvalent metal compound with a carboxyl-containing polymer latex or dispersion and precipitating the mixed dispersion and the like. Similarly the sulfide coated polyvalent metal compound may be dispersed in a solution of the carboxyl-containing polymer in an organic solvent for said polymer and the mixture may be coagulated or deposited as a film upon evaporation of the solvent. In mixing the polymer and sulfide coated polyvalent metal compound, mastication of the mixture should be continued until the resulting mixture is homogeneous with the sulfide coated polyvalent metal compound well dispersed in the polymer. Conventional softeners, plasticizers, curing agents, melting aids, reinforcement pigments such as carbon black and siliceous materials may be incorporated into the polymer-sulfide coated polyvalent metal compound composition embodied herein.

The sulfide-coated polyvalent metal compounds which may be utilized in the present invention are the oxides of zinc, magnesium, cadmium, calcium, titanium, aluminum, barium, strontium, copper(ic), cobalt(ic), tin and others. Specifically included are zinc oxide, calcium oxide, cadmium oxide, magnesium oxide, dibutyl tin oxide, lead oxide, barium oxide, cobalt oxide, tin oxide, strontium oxide, and others. In addition, various sulfide coated polyvalent metallic hydroxides, many of which in reality are hydrated metallic oxides and upon heating with polymer carboxyl groups readily split off water, such as calcium hydroxide, cadmium hydroxide, zinc hydroxide, barium hydroxide and others are utilizable. Similarly, carboxylic acid salts of the aforementioned polyvalent metals when coated with the polyvalent metal sulfide are meant to be included in the compositions of this invention. The sulfide coated polyvalent metal oxides are preferred and zinc sulfide coated oxide is most preferred in this invention.

The proportions of sulfide coated polyvalent metallic oxide required for efficient cure of applicants' compositions will vary, of course, depending upon the particular nature of the curing agent, on the inter-polymerized acid content (or —COOH content) of the polymer and on the fineness and compatibility of the sulfide coated metallic oxide with the rubber. Amounts of sulfide coated metallic oxide having metallic oxide equivalent to ½ the carboxyl content of the polymer product curable, non-scorching compositions. For optimum results the amount of curing agent should be at least equivalent chemically to the —COOH content of the polymer. Since excess curing agent does not have an adverse effect on the composition, it is generally preferred to utilize amounts of curing agent in excess of stoichiometrical proportions and preferably twice or more stoichiometrical amounts. Generally, however, amounts of the sulfide coated metallic oxide such as zinc sulfide coated zinc oxide varying from 1 to 30% based on the weight of carboxylic polymer will be found sufficient with amounts from 4 to 20% by weight being preferred.

The sulfide coated polyvalent metallic oxides embodied herein are most conveniently prepared by treating a dry, granular solid polyvalent metallic compound, such as zinc oxide, with gaseous hydrogen sulfide until the surface of the zinc oxide is converted to zinc sulfide. In order to maintain better control of his reaction it is often convenient to dilute the hydrogen sulfide with an inert gas (i.e. does not react with the polyvalent metal oxide) such as nitrogen, oxygen, and the like. The sulfide coating can also be done by treating the zinc oxide with hydrogen sulfide in a liquid medium such as water or in a less preferred procedure the polyvalent metal oxide may be reacted with liquified hydrogen sulfide at low temperatures or at pressure greater than atmospheric. Similarly the polyvalent metal compound may be coated on its surface by reaction with an organic sulfur compound such as a mercaptan, RSH, wherein R is a hydrocarbon group having from 1 to 20 carbon atoms.

The amount of hydrogen sulfide or mercaptan required for the coating operation will vary depending upon the particle size of the polyvalent metallic oxide. It has been found that a small particle size metallic oxide requires treatment with somewhat greater amounts of hydrogen sulfide than does a larger particle size metallic oxide. The metallic sulfide coating may only be a fine surface coating for the purposes of the present invention, however, the depth of the surface coat does not appear to be critical. As much as 50% of the original polyvalent metallic oxide may be converted to sulfide without completely retarding the ability of the product to cure a carboxyl-containing polymer.

Unless the polyvalent metallic oxide particles are completely coated with a sulfide layer, however, the resulting product is not effective in preventing premature curing or scorching of the carboxylic polymer composition. The ultimate particle size of the sulfide coated polyvalent metal oxides embodied herein is not critical in the present invention. Particles having average diameters of from 0.01 to 10 microns are preferred and those having average diameters of from about 0.1 to 5 are most preferred. It has been found that particulate polyvalent metal oxides having a coating of as little as 0.01% by weight of the polyvalent metal sulfide can be used in carboxylic polymer mixtures which are non-scorching but readily curable at ordinary cure temperatures.

The sulfide coated polyvalent metal oxides embodied in the instant invention are to be distinguished from fatty acid salt coated polyvalent metal oxides described in U.S. Patent No. 2,303,329 because the latter materials are truly very readily incorporated into rubbers, but they do not prevent scorching when incorporated into carboxyl containing polymers of the type embodied herein.

Because polyvalent metal salts of carboxylic acids are known to be excellent curing agents for carboxylic polymers, it is to be expected that a polyvalent metal oxide coated with a polyvalent metal salt of a carboxylic acid such as zinc propionate coated zinc oxide, would cause room temperature cure or scorching when it is mixed into a carboxylic polymer. The mechanism whereby the sulfide coated polyvalent metal oxides prevent scorching but do cause cure is not completely understood at present. It is possible that the coating of polyvalent metal sulfide or mercaptide, which is known to have no effect on the cure, protects the reactive polyvalent metal oxide until higher cure temperatures are reached at which point the polyvalent metal oxide becomes available for the cure reaction.

The following examples wherein the amounts of ingredients are given in parts by weight unless otherwise indicated will illustrate the compositions and processes of this invention.

Example I

A reaction vessel was charged with 150 g. of a dry particulate zinc oxide having a particular size of about 1 micron. The zinc oxide mass was agitated vigorously at about 25° C. and at the same time a steady stream of hydrogen sulfide gas was introduced into the reaction vessel and was allowed to react with the zinc oxide. After a total of 488 ml. of hydrogen sulfide gas had been introduced into the mixture the reaction was stopped. The colorless, granular product was dried and was found by analysis to contain 0.3% by weight of zinc sulfide. In a similar manner several particulate zinc oxides were prepared and their original particle size and the sulfide content of the products are listed below.

| Average particle size of starting ZnO: | Percent by weight of ZnS in product |
|---|---|
| 0.2 micron | 2.5 |
| 0.2 micron | 11.4 |
| 1.0 micron | 0.14 |
| 1.0 micron | 2.0 |
| 1.0 micron | 3.5 |
| 1.5 microns | 1.8 |
| 1.5 microns | 6.25 |

The foregoing zinc sulfide coated zinc oxide prepared from 1 micron zinc oxide and having 0.3% by weight of zinc sulfide was used as a curing agent in a carboxylic rubber recipe as shown in C below. For comparison purposes recipe A employs the conventional uncoated zinc oxide curing agent and recipe B employs zinc sulfide.

|  | A | B | C |
|---|---|---|---|
| 67 butadiene–27 acrylonitrile–6 methacrylic acid interpolymer having 0.0675 ephr. of —COOH and a Mooney viscosity of 60 | 100 | 100 | 100 |
| Zinc oxide | 5.0 | | |
| Zinc sulfide | | 5.0 | |
| Zinc sulfide coated zinc oxide | | | 5.0 |
| Carbon black (FEF) | 40 | 40 | 40 |

Each mixture was prepared on a rubber mill and the Mooney viscosity (ML 212° F.) was determined for each stock just after mixing and again after standing at room temperature for 30 days.

|  | A | B | C |
|---|---|---|---|
| Mooney viscosity, 4 min | 93 | 81 | 84 |
| Mooney viscosity, 4 min. in 30 days | 107 | 80 | 85 |

Mooney scorch was determined for each sample at 250° F. and at 310° F. (the latter is cure temperature).

|  | A | B | C |
|---|---|---|---|
| Mooney scorch (250° F.) | 6 min | No cure | No cure. |
| Mooney scorch (310° F.) | 2 min | do | 4 min. |

Milled stocks of each of the above recipes were cured at 310° F. for 30 minutes. The resulting vulcanizates had the following physical properties.

|  | A | B | C |
|---|---|---|---|
| Compression set (70 hrs.): | | | |
| Room temperature, percent | 85 | No cure | 85 |
| 212° F., percent | 104 | do | 102 |
| NBS Abrasion Index | 10 | do | 10 |
| Stress-Strain-Room Temp.: | | | |
| Tensile, p.s.i | 5,100 | do | 5,000 |
| 300% Modulus, p.s.i | 3,200 | do | 3,300 |
| Elongation, percent | 450 | do | 450 |

It is apparent that ZnS does not function as a curing agent (see properties of vulcanizate B). It is also obvious that the zinc sulfide coated zinc oxide curing agent prevents scorching but that cured stocks employing it are practically indistinguishable over those employing conventional ZnO at the conventional cure temperature. A zinc methyl mercaptide coated zinc oxide prepared by treating zinc oxide with methyl mercaptan in the foregoing manner functioned in a manner similar to the zinc sulfide coated zinc oxide in the foregoing carboxyl containing polymer.

Several zinc sulfide coated zinc oxides were prepared in the foregoing manner starting with zinc oxide having an average particle size of 1 micron and these were used in a recipe similar to recipe C above. The mixed stocks were subjected to the Mooney scorch test with the following results:

| Percent by weight of Zinc Sulfide | Mooney Scorch | |
|---|---|---|
|  | 250° F. | 310° F. |
| 2.0 | No cure | 3 min. |
| 3.48 | do | 7 min. |
| 5.52 | do | 7 min. |
| 8.17 | do | 6 min. |

When the ZnO in recipe A (above) was replaced with zinc propionate coated ZnO, prepared according to U.S. Patent 2,303,329, premature scorching of the stock occurred.

Example II

In a manner similar to that described in Example I two rubber stocks were prepared using a butadiene-methacrylic acid copolymer rubber, the conventional zinc oxide accelerator and sulfur (A) and the zinc sulfide coated zinc oxide prepared from 1 micron zinc oxide by the procedure of Example I containing 33.4% by weight of zinc sulfide (B).

|  | A | B |
|---|---|---|
| 92 butadiene-8 methacrylic acid copolymer having 0.105 ephr. of —COOH and a Mooney viscosity of 55 | 100 | 100 |
| Stearic acid | 1 | 1 |
| Processing oil (petroleum oil) | 5 | 5 |
| Zinc oxide | 5 | |
| Zinc sulfide coated zinc oxide | | 5 |
| Carbon black (HAF) | 45 | 45 |
| MBTS (mercaptobenzothiazole disulfide) | 1 | 1 |
| Sulfur | 2 | 2 |

The stocks were prepared by mixing the recipes on a rubber mill. The uncured stocks had the following physical properties:

|  | A | B |
|---|---|---|
| Mooney viscosity, 4 min | Too tough | 65. |
| Mooney scorch (250° F.) | do | 10 min. |
| Mooney scorch (310° F.) | do | 2.5 min. |

Stocks cured at 310° F. for 30 minutes had the following physical properties:

|  | A | B |
|---|---|---|
| Compression set (70 hrs.): | | |
|   Room temperature, percent | 80 | 72 |
|   212° F., percent | 95 | 90 |
| NBS Abrasion Index | (1) | 200 |

[1] Overcured.

Example III

The procedure followed in this example is similar to that of Example I. The following recipes were used. The zinc sulfide coated zinc oxide used in recipe B contained 33.4% by weight zinc sulfide.

|  | A | B |
|---|---|---|
| 92 butadiene-8 methacrylic acid copolymer having 0.105 ephr. of —COOH and a Mooney viscosity of 55 | 100 | 100 |
| Zinc oxide | 5.0 | |
| Zinc sulfide coated zinc oxide | | 5.0 |
| Carbon black (HAF) | 45 | 45 |

The stocks were mixed in a Banbury mixer and the resulting mixtures had the following properties:

|  | A | B |
|---|---|---|
| Mooney viscosity, 4 min | Too tough | 95. |
| Mooney viscosity, 4 min. in 30 days | do | 95. |
| Mooney scorch (250° F.) | do | 10 min. |
| Mooney scorch (310° F.) | do | 2½ min. |

Samples of stocks A and B were cured in molds at 310° F. for 30 min. and the resulting vulcanizates had the physical properties shown below:

|  | A | B |
|---|---|---|
| Compression set (70 hrs.): | | |
|   Room temperature, percent | 79.5 | 72.3 |
|   212° F., percent | 95.3 | 90 |
| NBS Abrasion Index | (1) | 199.4 |

[1] Overcure.

Similar results were obtained with a zinc dodecyl mercaptan coated zinc oxide in recipe B.

Example IV

The procedures described in Example I were followed. The following recipes were used. The zinc sulfide coated zinc oxide of recipe B was prepared from 1 micron zinc oxide and contained 2.0% by weight of zinc sulfide.

|  | A | B |
|---|---|---|
| 67 butadiene-27 acrylonitrile-6 methacrylic acid interpolymer having Mooney viscosity of about 60 | 100 | 100 |
| Stearic acid | 1.0 | 1.0 |
| Zinc oxide | 5.0 | |
| Zinc sulfide coated zinc oxide | | 5.0 |
| Carbon black (FEF) | 45 | 45 |
| Tetramethyl thiuram disulfide | 3.5 | 3.5 |

The stocks were mixed in a Banbury mixer and the resulting stocks had the following properties:

|  | A | B |
|---|---|---|
| Mooney viscosity, 4 min | 69 | 65 |
| Mooney viscosity, 4 min., 30 days | (1) | 68 |
| Mooney scorch (250° F.), min | 2½ | 11 |
| Mooney scorch (310° F.), min | ½ | 1½ |

[1] Too tough.

Samples of stocks A and B were cured at 310° F. for 30 minutes. The resulting vulcanizates had the following properties:

|  | A | B |
|---|---|---|
| Compression set (70 hrs.): | | |
|   Room temperature, percent | 37.3 | 34.2 |
|   212° F., percent | 43.5 | 49.5 |
| NBS Abrasion Index | 9 | 10 |
| Stress-Strain-Room Temperature: | | |
|   Tensile, p.s.i | 4,400 | 4,450 |
|   300% Modulus, p.s.i | 3,100 | 3,000 |
|   Elongation, percent | 440 | 460 |

Example V

The sulfide coated polyvalent metal oxides embodied herein are useful in cements and dispersions of carboxyl containing polymers. A series of adhesive cements which are curable with heat and should have long shelf life at ordinary temperatures was prepared. A rubbery butadiene-acrylonitrile-methacrylic acid polymer described in Example I was dissolved in methyl ethyl ketone (20% solution). Prior to the preparation of the cements the various zinc oxides and zinc sulfides listed in the following table were added to the rubbery polymer on a rubber mill. In each case 2 parts of the zinc oxide or zinc sulfide was used per 100 parts of rubbery polymer. Brookfield viscosities of the various cements were determined over a six week period and the results are given in the following table.

| | Brookfield Viscosities (cp.)— days after mixing | | | | | |
|---|---|---|---|---|---|---|
| | 4 | 6 | 13 | 20 | 27 | 48 |
| Percent ZnS Coated on ZnO: | | | | | | |
|   0.3 | 1,500 | 1,800 | 2,500 | 3,000 | 3,750 | 5,650 |
|   2.0 | 1,250 | 1,350 | 1,750 | 1,850 | 2,000 | 2,100 |
|   5.2 | 1,150 | 1,250 | 1,500 | 1,650 | 1,650 | 1,700 |
|   11.4 | 1,250 | 1,350 | 1,450 | 1,500 | 1,500 | 1,500 |
|   18.5 | 1,200 | 1,200 | 1,450 | 1,450 | 1,450 | 1,450 |
| 100% ZnO | 2,000 | 2,500 | 4,000 | 6,000 | 8,800 | 27,250 |
| 100% ZnS | 1,150 | 1,150 | 1,150 | 1,150 | 1,150 | 1,150 |
| No ZnO or ZnS | 900 | 900 | 900 | 900 | 900 | 900 |

The foregoing cements containing 100% ZnS and no ZnO or ZnS formed films which could not be cured by heat. All of the other cements listed above formed films which cured and became completely insoluble in methyl ethyl ketone after they had been heated at about 310° F. for an hour. At the end of 48 days the cement containing 100% ZnO was completely gelled and not pourable. All the other cements were pourable and free of gel at the end of this time.

We claim:
1. A plastic rubbery composition curable to the elastic rubbery condition by heating to curing temperatures of the order of about 310° F. and having the ability to be stored and processed at normal temperatures without premature curing, said composition comprising a plastic rubbery polymer of a butadiene-1,3 hydrocarbon containing from 0.001 to 0.30 chemical equivalents of carboxyl groups per 100 parts of polymer in which there is admixed, as curing agent therefor, from 1 to 30% by weight based on said polymer of particles consisting essentially of a base of polyvalent metal compound selected from the class consisting of polyvalent metal oxides, hydrated oxides and carboxylic acid salts, completely coated with a compound selected from the class consisting of sulfides and mercaptides of the same polyvalent metal.

2. A plastic rubbery composition curable to the elastic rubbery condition by heating to curing temperatures of the order of about 310° F. and having the ability to be stored and processed at normal temperatures without premature curing, said composition comprising a plastic rubbery interpolymer of butadiene-1,3 and an alpha-beta unsaturated carboxylic acid containing the $CH_2=C<$ group, said interpolymer containing from 0.01 to 0.20 chemical equivalents of carboxyl groups derived from said acid per 100 parts of polymer, in which there is admixed, as curing agent therefor, from 4 to 20% by weight based on said polymer of particles, of average diameter of 0.01 to 10 microns, consisting essentially of zinc oxide and zinc sulfide, the zinc sulfide content being about 2 to 8% by weight and the zinc oxide therein being completely coated by the zinc sulfide.

3. A plastic rubbery composition in accordance with claim 2 in which the plastic rubbery interpolymer is a three-component interpolymer of about 67 parts of butadiene-1,3, about 27 parts of acrylonitrile and about 6 parts of methacrylic acid.

4. A plastic rubbery composition in accordance with claim 2 in which the plastic rubbery interpolymer is a two-component interpolymer of about 92 parts of butadiene-1,3 and about 8 parts of methacrylic acid.

5. In the method of producing a cured elastic rubbery polymer of a butadiene-1,3 hydrocarbon containing from 0.001 to 0.03 chemical equivalent of combined carboxyl groups per 100 parts of polymer by the steps of mixing said polymer in the uncured plastic condition with particulate zinc oxide in an amount from ½ to 2 times that which is chemically equivalent to the carboxyl content of said polymer and then heating the resulting composition to curing temperature of the order of about 310° F., the improvement which consists in utilizing a particulate zinc oxide in which the zinc oxide particles are completely coated with zinc sulfide, thereby to prevent premature curing of said polymer during storage and processing prior to said heating step without substantially affecting the properties of said cured elastic rubbery polymer.

References Cited by the Examiner

UNITED STATES PATENTS

| 1,979,379 | 11/1934 | Gardner | 106—293 |
| 2,251,869 | 8/1941 | Gamble et al. | 106—296 |
| 2,724,707 | 11/1955 | Brown | 260—80.7 |
| 2,727,012 | 12/1955 | Treat et al. | |
| 2,849,426 | 8/1958 | Miller | 260—41.5 |

FOREIGN PATENTS 583,471   12/1946   Great Britain.

OTHER REFERENCES

Morton: "Introduction to Rubber Technology," Reinhold Pub. Corp., N.Y., 1959, p. 223.

MORRIS LIEBMAN, *Primary Examiner.*

WILLIAM H. SHORT, ALEXANDER H. BRODMERKEL, *Examiners.*

J. E. CARSON, K. B. CLARKE, J. S. WALDRON,
*Assistant Examiners.*